March 27, 1956     A. Y. DODGE     2,739,452
REFRIGERATING SYSTEM
Filed Oct. 4, 1954
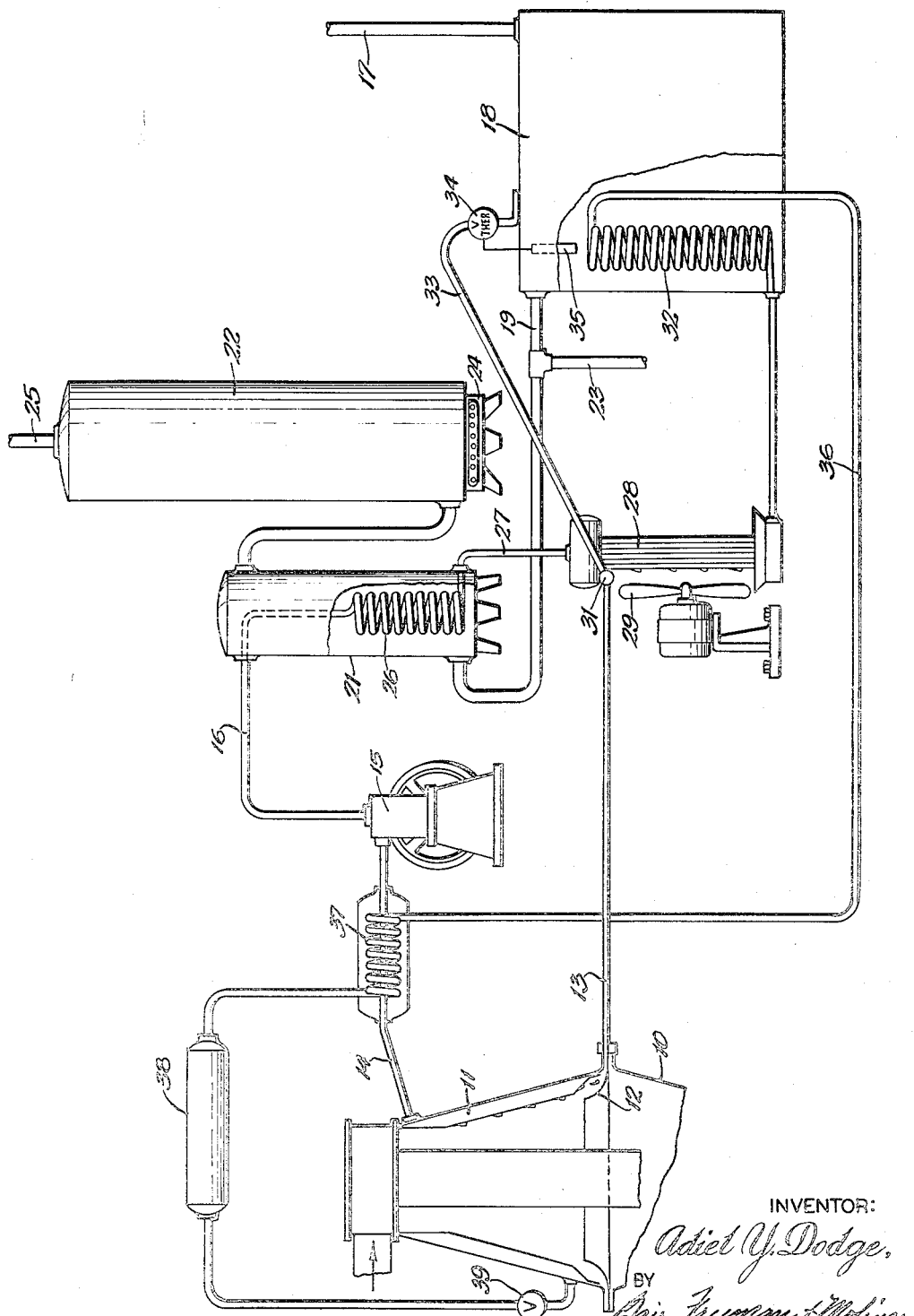
INVENTOR:
Adiel Y. Dodge,
BY
ATTORNEYS.

United States Patent Office 2,739,452
Patented Mar. 27, 1956

2,739,452
REFRIGERATING SYSTEM
Adiel Y. Dodge, Rockford, Ill.

Application October 4, 1954, Serial No. 460,078

8 Claims. (Cl. 62—3)

This invention relates to a refrigerating system and more particularly to means for extracting heat from refrigerant in a refrigerating system utilized for air conditioning or refrigeration, or like purposes.

In many communities the installation of refrigerating systems for air conditioning or the like is restricted by the lack of water for cooling the refrigerant. It is not practical to extract all of the heat from the refrigerant by air circulation in relatively large installations or in many types of smaller inside installations, and few municipalities have sufficient water capacity to supply all of the requirements for cooling refrigerating systems according to conventional methods.

It is, therefore, one of the objects of the present invention to provide a refrigerating system in which heat is extracted from the refrigerant with the use of very little or no water over and above that normally consumed for purposes other than cooling.

According to one feature of the invention, heat from the refrigerant is utilized to elevate to a relatively high temperature that portion of the normal water supply which is normally heated for washing and the like, and to heat very slightly the water used for incidental purposes where its temperature is substantially immaterial. Any deficiency in heat absorption capacity is made up by air cooling or by vaporizing the condensate removed and, when necessary, an additional small quantity of fresh water. Thus a very large quantity of heat can be dissipated in a very practical manner with the actual consumption of little or no water.

The above and other objects and features of the invention will be more readily apparent from the following description when read in connection with the accompanying drawing in which:

The single figure is a diagrammatic view of a refrigerating system embodying the invention.

As illustrated, the refrigerating system is to be used with an air conditioner including a casing 10 through which air is circulated and a portion of whose wall is cooled by an evaporator 11, such as set forth in my Patent 2,519,028. Details of the air conditioning system form no part of the present invention except insofar as the refrigerating system of the invention cools the evaporator 11 and any condensate formed on the evaporator 11 is collected in a trough 12 and conducted from the air conditioning apparatus through a conduit 13.

Refrigerant vaporized in the evaporator 11 is conducted therefrom through a conduit 14 to the inlet of compressor 15. The compressor 15 discharges compressed refrigerant through a conduit 16. The compressor 15 may be of any desired type and any desired type of refrigerant may be employed. According to the present invention, however, the refrigerant is of a type and is compressed to a pressure such that its temperature in the discharge conduit 16 shall be on the order of 150° F.

The heat contained in the compressed refrigerant is adapted to be extracted therefrom by water used for normal purposes in the building wherein the refrigerator or air conditioner is installed. Water is received in the building from any conventional public or private source through a supply pipe 17 connected to an inlet storage tank 18. The storage tank 18 is of a relatively large capacity on the order of 30 gallons more or less for the average dwelling house, although the exact capacity is not critical. Water is taken from the tank 18 for all normal household uses through an outlet pipe 19 which leads through a preheater tank 21 to a conventional hot water heater 22 to supply the hot water needs of the building for washing and the like. Water for other incidental purposes such as cold water washing, bathing and the like may be withdrawn from the outlet pipe 19 through a pipe 23. The water in the heater 22 may be further heated by a conventional burner 24 and water may be withdrawn from the heater through a pipe 25 for use.

According to the present invention, water which is to be heated for hot water purposes is preheated in the tank 21 by the hot refrigerant from the compressor 15. For this purpose a heating coil 26 is provided in the tank 21 connected to the conduit 16 and to an outlet conduit 27. The coil 26 is immersed in the water in the tank 21 so that the water will extract a substantial degree of heat from the hot compressed refrigerant and will in turn have its temperature elevated to a relatively high degree.

Refrigerant from the coil 26 is conducted by the conduit 27 to an air cooled heat exchanger 28 such as a radiator over which air is circulated by a fan 29. Condensate discharged from the air conditioner through the pipe 13 may be conducted to a drip head 31 and dripped or sprayed over the heat exchanger 28 to be evaporated thereon. In this manner the condensate is readily disposed of and evaporation thereof on the heat exchanger substantially increases the capacity of the heat exchanger.

From the heat exchanger the refrigerant is conducted through a heat exchange coil 32 immersed in the water in the inlet tank 18. A relatively small quantity of heat will be extracted from the refrigerant through the coil 32 to raise the temperature of water in the tank 18 to a limited degree. For example, it will normally not be desired to raise the temperature of water in the tank above about 80° F. and in many cases it may be desired to maintain the outlet water below 70°. However, in all cases the temperature of the water in the tank 18 can be raised at least 5° F. without creating any undesired effects to extract additional heat from the refrigerant and reduce it to a lower temperature.

To insure that the temperature in the tank 18 does not rise above a desired value, an outlet pipe 33 is connected to the tank 18 and is controlled by a thermostatic valve 34 responsive to a bulb 35 in the tank. When the temperature of water in the tank reaches the upper desired temperature, the valve 34 will be opened to withdraw water therefrom through the pipe 33. This water may be conducted to the spray 31 to be discharged over the heat exchanger 28 thereby to assist in further cooling the refrigerant. Under normal conditions the valve 34 will remain closed so that no water will be withdrawn from the tank 18 except for the other normal purposes of use.

The refrigerant leaving the coil 32 is conducted through a conduit 36 to a heat exchanger 37 lying in heat exchanging relationship with the conduit 14. Heat will be extracted from the refrigerant to reduce it down to a still lower temperature in the heat exchanger 37 by the refrigerant leaving the evaporator which is at a lower temperature. This positively insures that refrigerant supplied to the evaporator will be at a low temperature. From the heat exchanger 37 the refrigerant may flow into a reservoir 38 and from the reservoir 38 past a conventional expansion valve 39 and into the evaporator.

According to the present invention, it is intended that the major part of the heat shall be extracted in the preheater 21 through the coil 26. It may be assumed that for extreme conditions the amount of cooling required is equal to 50 B. t. u. per person per minute or 36,000 B. t. u. per person per day. The average amount of water used per person in most communities is at least 200 gallons per day per person and is higher than this in the summer seasons when air conditioning is required. Assuming that approximately ⅛ of this amount is heated for washing and the like, there would be 200 lbs. of hot water used per person per day plus 1400 lbs. of cold water per person per day. If the temperature of the water to be heated is raised 80° F. in the preheater 21 the water heated therein would extract 16,000 B. t. u. per person per day from the refrigerant.

Assuming that the water passing through the inlet tank 18 is raised in temperature 5° F. the 200 gallons per person per day passing through the tank would absorb 8,000 B. t. u. per person per day. This would leave only an additional 12,000 B. t. u. to be absorbed which could easily be accomplished through the air cooled heat exchanger 28, particularly with the condensate being discharged thereon. However, under extreme conditions a relatively small amount of water only would be discharged past the valve 34 to be evaporated on the heat exchanger 28 to make up any deficit.

By the use of the present invention, therefore, the heat extracted by the refrigerant from the air or other mass to be cooled is effectively utilized primarily to preheat the normal hot water supply. Even under extreme conditions, when the use of water is below the average rate or the cooling required is above the maximum anticipated, cooling can be effected with the use of no additional water or at most a relatively small amount. Thus the present invention makes it feasible to use water cooled air conditioners or refrigerators, or the like, in locations where the use thereof is now prohibited by lack of adequate water supply.

While one embodiment of the invention has been shown and described in detail, it will be understood that this is illustrative only and is not to be taken as a definition of the scope of the invention, reference being had for this purpose to the appended claims.

What is claimed is:

1. A refrigerating system comprising a refrigerant compressor, a refrigerant evaporator connected to the inlet of the compressor, a tank connected in a water supply system, a heating coil in the tank connected to the outlet of the compressor to receive hot refrigerant therefrom and to heat water in the tank, an air cooled heat exchanger connected to the coil to receive refrigerant therefrom, a refrigerant conducting connection from the heat exchanger to the evaporator and means to collect condensate from the evaporator and discharge collected condensate on to the heat exchanger.

2. A refrigerating system comprising a refrigerant compressor, a refrigerant evaporator connected to the inlet of the compressor, a tank connected in a water supply system, a heating coil in the tank connected to the outlet of the compressor to receive hot refrigerant therefrom and to heat water in the tank, an air cooled heat exchanger connected to the coil to receive refrigerant therefrom, a second tank connected in the water supply system, a heat exchange coil in the second tank connected to the heat exchanger to receive refrigerant therefrom, and a refrigerant conducting connection from the last named coil to the evaporator.

3. A refrigerating system comprising a refrigerant compressor, a refrigerant evaporator connected to the inlet of the compressor, a tank connected in a water supply system, a heating coil in the tank connected to the outlet of the compressor to receive hot refrigerant therefrom and to heat water in the tank, an air cooled heat exchanger connected to the coil to receive refrigerant therefrom, a second tank connected in the water supply system, a heat exchange coil in the second tank connected to the heat exchanger to receive refrigerant therefrom, a refrigerant conducting connection from the last named coil to the evaporator, a connection from the second tank to the heat exchanger to discharge water from the second tank over the heat exchanger to cool it, a valve in the connection, and means responsive to the temperature of the water in the second tank to control the valve.

4. A refrigerating system comprising a refrigerant compressor, a refrigerant evaporator connected to the inlet of the compressor, a tank connected in a water supply system, a heating coil in the tank connected to the outlet of the compressor to receive hot refrigerant therefrom and to heat water in the tank, an air cooled heat exchanger connected to the coil to receive refrigerant therefrom, a second tank connected in the water supply system, a heat exchange coil in the second tank connected to the heat exchanger to receive refrigerant therefrom, and a refrigerant conducting connection from the last named coil to the evaporator, the last named refrigerant conducting connection including a portion in heat transferring relationship with the connection between the evaporator and the compressor inlet.

5. A refrigerating system comprising a refrigerant compressor, a refrigerant evaporator connected to the inlet of the compressor, an air cooled heat exchanger connected to the compressor outlet, a tank connected in a water supply system, a coil in the tank connected to the heat exchanger to receive refrigerant therefrom, a connection from the tank to the heat exchanger to discharge water from the tank over the heat exchanger to cool it, a valve responsive to the temperature of water in the tank mounted in the connection to control the flow of water therethrough, and a refrigerant flow connection from the coil to the evaporator.

6. A refrigerating system comprising a refrigerant compressor, a refrigerant evaporator connected to the inlet of the compressor, an air cooled heat exchanger connected to the compressor outlet, a tank connected in a water supply system, a coil in the tank connected to the heat exchanger to receive refrigerant therefrom, a connection from the tank to the heat exchanger to discharge water from the tank over the heat exchanger to cool it, a valve responsive to the temperature of water in the tank mounted in the connection to control the flow of water therethrough, and a refrigerant flow connection from the coil to the evaporator including a portion in heat exchanging relationship with the refrigerant connection between the evaporator and the compressor inlet.

7. A refrigerating system comprising a refrigerant compressor, a refrigerant evaporator connected to the compressor inlet, a preheater tank in a water supply system, a heat coil in the tank connected to the outlet of the compressor to receive hot refrigerant therefrom and to preheat the water in the tank, said preheated water being delivered to a water heater supplying hot water for washing purposes, an air cooled heat exchanger connected to the coil to receive refrigerant therefrom, a second tank connected in the water supply system so that at least a large proportion of the water supply passes through the said second tank, a heat exchanger coil in the second tank connected with the heat exchanger to receive refrigerant therefrom, to cool the refrigerant to a temperature below that of the refrigerant discharged from the heat exchanger.

8. A refrigerating system comprising a refrigerant compressor, a refrigerant evaporator connected to the compressor inlet, a preheater tank in a water supply system, a heat coil in the tank connected to the outlet of the compressor to receive hot refrigerant therefrom and to preheat the water in the tank, said preheated water being delivered to a water heater supplying hot water for washing purposes, an air cooled heat exchanger connected to the coil to receive refrigerant therefrom, a second tank connected in the water supply system so that at least a large proportion of the water supply passes through the said second tank, a heat exchanger coil in the second tank connected with the heat exchanger to receive refrigerant therefrom, to cool the refrigerant to a temperature below that of the refrigerant discharged from the heat exchanger, and means responsive to a predetermined high water temperature in the second tank to withdraw water therefrom and direct it over the heat exchanger.

References Cited in the file of this patent

UNITED STATES PATENTS

| | | |
|---|---|---|
| 2,519,028 | Dodge | Aug. 15, 1950 |
| 2,589,855 | Pabst | Mar. 18, 1952 |
| 2,690,649 | Borgerd | Oct. 5, 1954 |